US010555621B2

(12) United States Patent
Onyszko

(10) Patent No.: US 10,555,621 B2
(45) Date of Patent: Feb. 11, 2020

(54) COVER HAVING INTERNAL SECURING BENDABLE RODS

(71) Applicant: Gerard Onyszko, Chicago, IL (US)

(72) Inventor: Gerard Onyszko, Chicago, IL (US)

( * ) Notice: Subject to any disclaimer, the term of this patent is extended or adjusted under 35 U.S.C. 154(b) by 738 days.

(21) Appl. No.: 15/189,754

(22) Filed: Jun. 22, 2016

(65) Prior Publication Data

US 2017/0007037 A1   Jan. 12, 2017

Related U.S. Application Data

(60) Provisional application No. 62/190,615, filed on Jul. 9, 2015.

(51) Int. Cl.
H05B 3/34 (2006.01)
A47D 15/00 (2006.01)
B62B 9/14 (2006.01)

(52) U.S. Cl.
CPC ............... A47D 15/00 (2013.01); H05B 3/34 (2013.01); H05B 3/342 (2013.01); B62B 9/142 (2013.01)

(58) Field of Classification Search
None
See application file for complete search history.

(56) References Cited

U.S. PATENT DOCUMENTS 5,671,497 A * 9/1997 Abdo ..................... A45D 34/04
                                                          15/144.1
8,573,125 B1 * 11/2013 Rossow ................... F42D 5/05
                                                          102/303
2006/0231120 A1 * 10/2006 Knopow ............... A46B 5/0075
                                                          134/6
2007/0068928 A1 * 3/2007 Augustine ............... A61F 7/007
                                                          219/528
2007/0068930 A1 * 3/2007 Augustine ............... A61F 7/007
                                                          219/549
2008/0230530 A1 * 9/2008 Augustine ............... H05B 3/342
                                                          219/212
2009/0165206 A1 * 7/2009 Davis ................... A47D 15/006
                                                          5/494
2010/0170039 A1 * 7/2010 Davis ................... A47D 15/006
                                                          5/494
2011/0156455 A1 * 6/2011 Fair ..................... A63H 33/006
                                                          297/188.01

(Continued)

FOREIGN PATENT DOCUMENTS

CA           2683107 A1 *  4/2011  ............. A47D 15/02

Primary Examiner — Joseph M Pelham
(74) Attorney, Agent, or Firm — Justin Lampel

(57) ABSTRACT

A cover having internal securing bendable rods is provided. The cover may have a top, a bottom, a first side, a second side, a front and a back. The front and the back of the cover may each have an internal sleeve which receives a durable elongated securing metal rod. The rods may be bendable so as to allow the user to bend the rods into virtually limitless positions including bending the rods partially around an object for securing the cover in a desired orientation. A padded sleeve may fit over the bendable rods to provide protection. The cover is especially suitable for using in connection with various strollers, cribs, car seats, highchairs or the like and may provide warmth and shade to a child. The cover is also ideal for adults in numerous situations, such as for use on a beach.

15 Claims, 6 Drawing Sheets

(56) References Cited

U.S. PATENT DOCUMENTS

| | | | | |
|---|---|---|---|---|
| 2011/0248533 A1* | 10/2011 | Henderson | .............. | B62B 9/142 |
| | | | | 297/184.13 |
| 2014/0316494 A1* | 10/2014 | Augustine | .............. | H05B 3/342 |
| | | | | 607/112 |
| 2015/0183352 A1* | 7/2015 | Bowe | .................... | A47D 15/00 |
| | | | | 297/184.11 |

* cited by examiner

COVER HAVING INTERNAL SECURING BENDABLE RODS

CROSS REFERENCE TO RELATED APPLICATION

The following application is a based on and claims the priority benefit of U.S. Provisional Application Ser. No. 62/190,615 filed on Jul. 9, 2015; the entire contents of which are incorporated by reference.

BACKGROUND OF THE INVENTION

A cover having internal securing bendable rods is provided. The cover may have a top, a bottom, a first side, a second side, a front and a back. The front and the back of the cover may each have an internal sleeve which receives a durable elongated securing metal rod. The rods may be bendable so as to allow the user to bend the rods into virtually limitless positions including bending the rods partially around an object for securing the cover in a desired orientation. A padded sleeve may fit over the bendable rods to provide protection. The cover is especially suitable for using in connection with various strollers, cribs, car seats, highchairs or the like and may provide warmth and shade to a child. The cover is also ideal for adults in numerous situations, such as for use on a beach.

Attempts have been made to provide easy to use covers for strollers. For example, U.S. Pat. No. 5,956,766 to Benway discloses a cover for warming a child seated in a stroller having a frame, a seat, and push handles is provided. The cover includes a sack portion for receiving the legs of the child seated in the stroller, the sack portion having side walls, a rear wall, and a front wall. The cover also includes an upper portion for covering the torso of the child seated in the stroller. The upper portion includes a front wall and side walls, each of the side walls including an upper and a lower section. The front wall of the upper portion is attached to the lower sections of the side walls of the upper portion such that the front wall forms a flap which may cover the chest of the child seated in the stroller during particularly cold weather, and which may be folded down during more mild weather and when the child is to exit the stroller. A set of upper fastener strips is attached to the side walls of the upper portion for attaching the cover to the push handles of the stroller, and a set of lower fastener strips is attached to the side walls of the upper portion for attaching the cover to the frame of the stroller proximate to the seat of the stroller.

Further, U.S. Pat. No. 5,781,946 to McEntire discloses a cover/seat cover (7) for a portable infant car seat or apparatus having a flat cross-shaped member (8) having a midsection area (9), a right side extension (10), a left side extension (11), a lower extension (12) and an upper extension (13) each extension having a fold line (24) common to said mid-section area (9) allowing each extension to be folded, a strap (14) located on each side of said mid-section area (9), a leg pocket member (15) having an attachment means to said flat cross-shaped member (8) with upper edge unattached, a slit (20) at center of said leg pocket member (15), a central opening (16) to accommodate shoulder-body strap locking devise, a storage pocket member (17) having an attachment means to said flat cross-shaped member (8) with lower edge unattached, a storage pocket closure member (19) having an attachment means to said flat cross-shaped member (8) with upper edge and both sides unattached of said storage pocket closure member (19) having an attachment means for storage pocket (18) allowing said storage closure member (19) to engage and disengage with said storage pocket member (17), a filler (21) is used when a double layer of said flat cross-shaped member (8) is employed, no filler (21) if single layer, said flat cross-shaped member (8) having a edging (22) typical at all edges with an attachment means for edging (23).

However, these patents fail to disclose a cover having an internal securing bendable rod which is easy to use and efficient. Further, these patents fail to provide a cover having an internal securing bendable rod which is padded and which may be secured to a stroller, crib or car seat in an easy fashion. Accordingly, a need exists for an improved cover for securing to objects.

SUMMARY OF THE INVENTION

A cover having internal securing bendable rods is provided. The cover may have a top, a bottom, a first side, a second side, a front and a back. The front and the back of the cover may each have an internal sleeve which receives a durable elongated securing metal rod. The rods may be bendable so as to allow the user to bend the rods into virtually limitless positions including bending the rods partially around an object for securing the cover in a desired orientation. A padded sleeve may fit over the bendable rods to provide protection. The cover is especially suitable for using in connection with various strollers, cribs, car seats, highchairs or the like and may provide warmth and shade to a child. The cover is also ideal for adults in numerous situations, such as for use on a beach.

An advantage of the present cover having an internal securing bendable rod is that the present internal securing bendable rod may be used to temporarily secure the cover to a stroller, crib, car seat, highchair or the like so that the cover does not fall or otherwise move from a desired orientation.

Another advantage of the present cover having an internal securing bendable rod is that the present cover having an internal securing bendable rod may have a padded sleeve portion covering the internal securing bendable rod for increased safety and protection.

Yet another advantage of the present cover having an internal securing bendable rod is that the present cover having an internal securing bendable rod, in an alternative embodiment, may have a magnetic portion on the bendable rods which more easily secures the cover to any metal of, for example, a stroller, crib, car seats, highchair or the like.

And still another advantage of the present cover having an internal securing bendable rod is that the present cover having an internal securing bendable rod, in an alternative embodiment, may have an internal heating pad for providing warm to a person.

Still another advantage of the present cover having an internal securing bendable rod is that, in an alternative embodiment, the cover may have a plurality of securing straps for securing the cover to an object.

In an embodiment, the present cover may have a removable second layer which may be secured to the main layer in a variety of orientations.

For a more complete understanding of the above listed features and advantages of the cover having an internal securing bendable rod reference should be made to the following detailed description of the preferred embodiments and to the accompanying drawings.

DETAILED DESCRIPTION OF THE PREFERRED EMBODIMENTS

A cover having internal securing bendable rods is provided. The cover may have a top, a bottom, a first side, a second side, a front and a back. The front and the back of the cover may each have an internal sleeve which receives a durable elongated securing metal rod. The rods may be bendable so as to allow the user to bend the rods into virtually limitless positions including bending the rods partially around an object for securing the cover in a desired orientation. A padded sleeve may fit over the bendable rods to provide protection. The cover is especially suitable for using in connection with various strollers, cribs, car seats, highchairs or the like and may provide warmth and shade to a child. The cover is also ideal for adults in numerous situations, such as for use on a beach.

Figure 1:
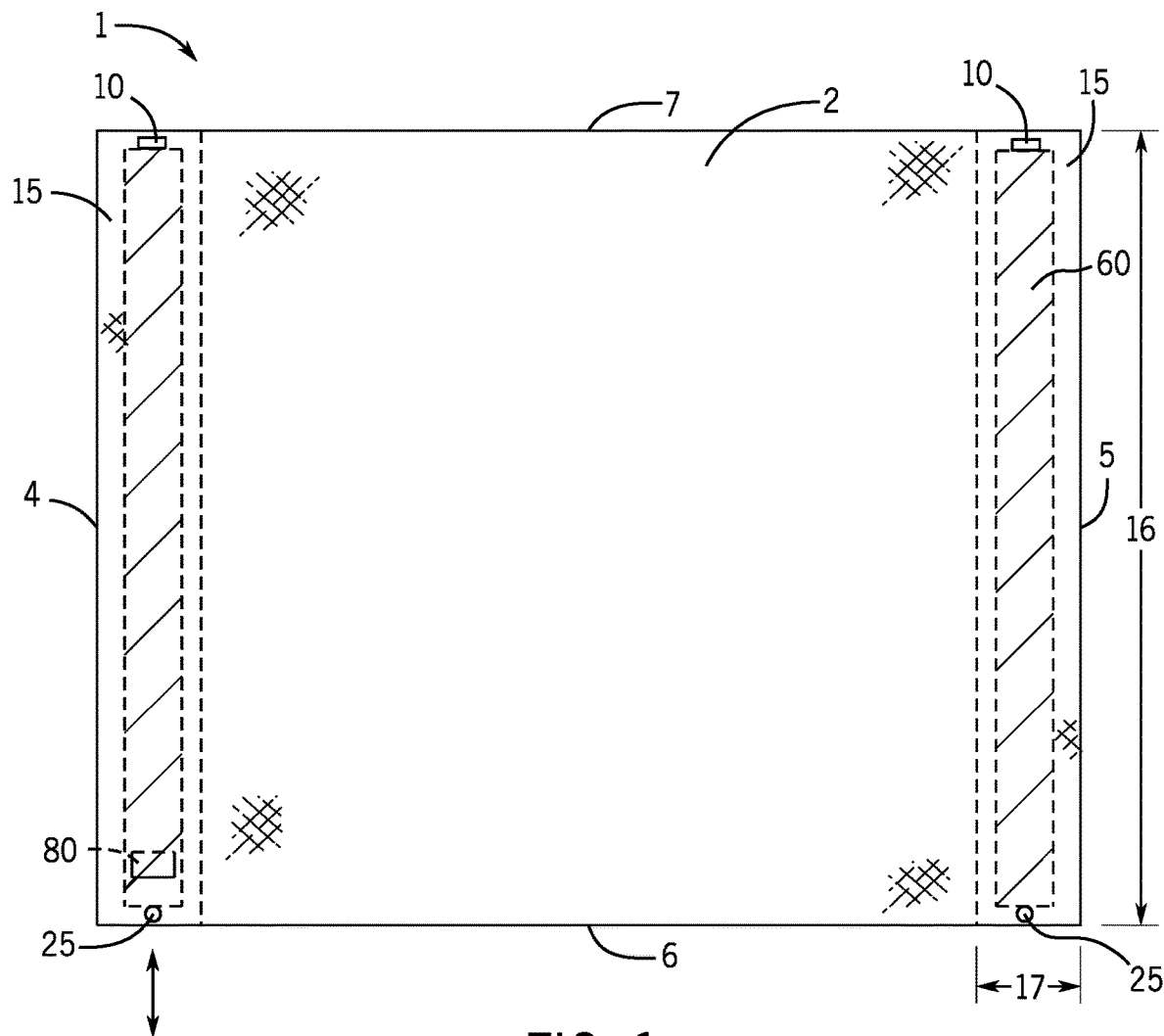
FIG. 1 illustrates a top view of the cover having an internal securing bendable rod.
Figure 2:
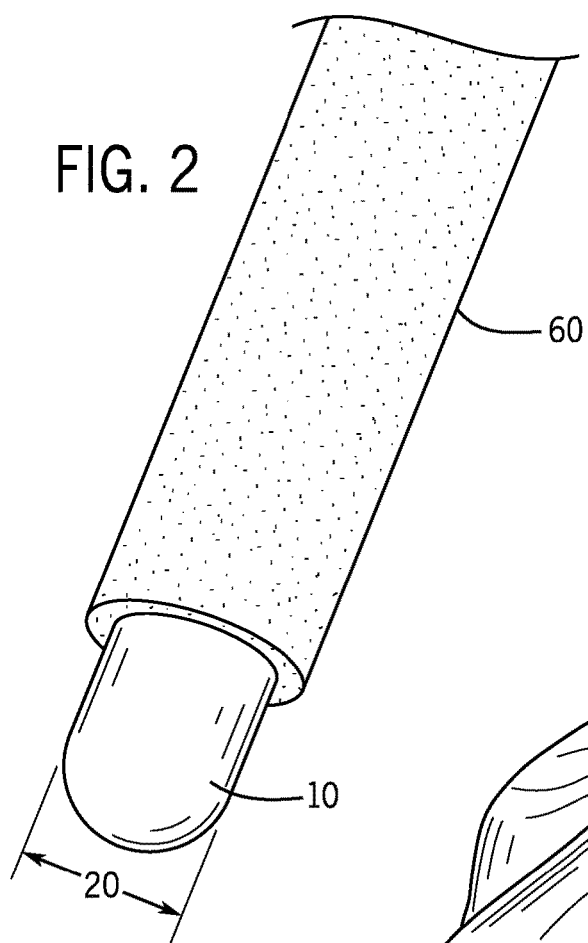
FIG. 2 illustrates a perspective view of the internal securing bendable rod wherein a protective pad surrounds the internal securing bendable rod.

Referring now to FIGS. 1 and 2, in an embodiment, a cover (or "blanket") 1 with at least one internal securing bendable rods 10 is provided. The bendable rods 10 may be, for example, a series of metal coils allowing the bendable rods 10 to be bent and to maintain the orientation desired by and created by the user. Preferably, the internal securing bendable rods 10 have a protective padding 60 so as to reduce injury to a user while using the cover 1. In an embodiment, the protective padding 60 may be rubber and/or foam. In an embodiment, the protective padding 60 is removable from the bendable rods 10 for replacement or to swap out a specific bendable rod 10 for protective paddings 60 of various sizes. More specifically, a user may desire a thick protective padding 60, a thin protective padding 60 or may elect to utilize the bendable rods 10 within the cover 1 without any protective paddings 60. The cover 1 may have a top surface 2, a bottom surface 3 (FIG. 7), a front 4, a back 5, a first side 6 and a second side 7. Preferably, the cover 1 is mainly made of, for example, a cloth or other suitable soft material. The internal securing bendable rods 10 may be selectively (at least partially) secured around an object 200 (such as a stroller, crib, highchair or the like) so that the cover 1 remains in a desired orientation with respect to the object 200 and further, to prevent the cover 1 from falling. The internal bendable rods 10 then prevent movement of the cover 1 away from the object 200.

In an embodiment, the front 4 and the back 5 of the cover 1 may each have an elongated internal sleeve portion 15. The elongated internal sleeve portions 15 may be generally hollow having a length 16 and a width 17 wherein the length 16 of the elongated internal sleeve portions 15 extends substantially the entire length of the front 4 and the back 5 of the cover 1. The width 17 of the elongated internal sleeve portions 15 may be slightly greater than a diameter 20 (FIGS. 2 and 7) of the internal securing bendable rods 10 so as to allow the internal securing bendable rods 10 to fit snugly within the elongated internal sleeve portions 15. In an embodiment, a hook and loop fastener system, button system or the like 25 (FIG. 1) may be located at the end of the elongated internal sleeve portions 15 such that a user may selectively open or close the elongated internal sleeve portions 15 (through an opening at the end of the elongated sleeve portion 15 which exposes a hollow interior of the elongated sleeve) to insert or remove the internal securing bendable rods 10. In particular, the internal securing bendable rods 10 may be removed from the elongated internal sleeve portions 15 so that the cover 1 may be washed in a standard washing machine without the bendable rods 10.

In an embodiment, the user may elective utilize the cover 1 without the bendable rods 10 so that the cover 1 acts as a standard blanket. After washing, the internal securing bendable rods 10 may be reinserted into the elongated sleeves portions 15 and the fastener system 25 resealed therein preventing the internal securing bendable rods 10 from falling out of the elongated internal sleeve portions 15 of the cover 1. In an embodiment, the elongated sleeve portions 15 may be permanently secured on one end so that the used only needs to temporarily secure the end opening of one of the two ends of each elongated sleeve portions 15 to secure the bendable rods 10 within the cover 1.

Figure 7:
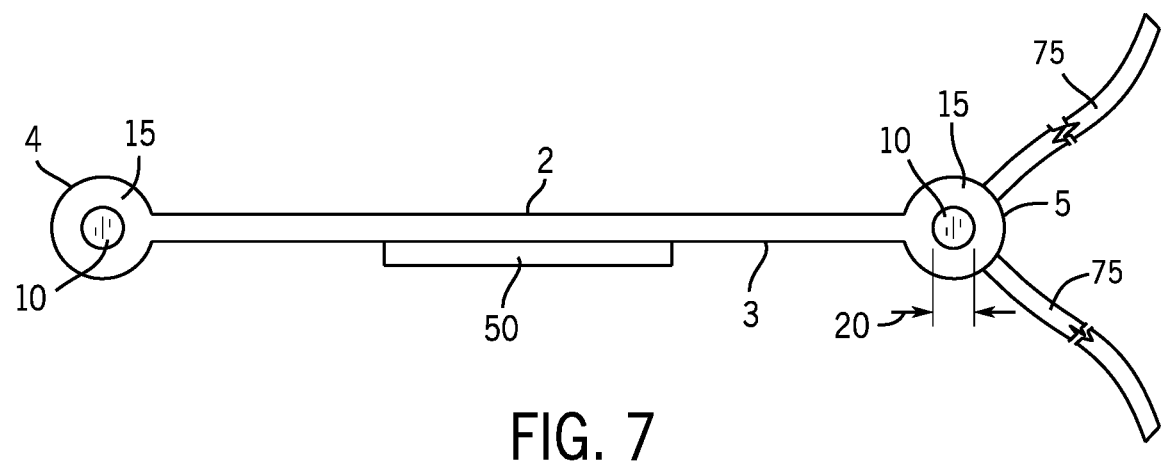
FIG. 7 illustrates a side view of the cover in an alternative embodiment.

In an alternative embodiment, the cover 1 may have an internal heating element 50 (FIG. 7). In particular, the internal heating element 50 may be secured to the top surface 2 and/or the bottom surface 3 of the cover 1 or within an interior compartment (not shown) of the cover 1. When the cover 1 is secured to the object 200, the heating element 50 may be activated (by for example plugging the cover 1 into an outlet with a cord or utilizing an internal battery) so that the heat generated by the heating element 50 may be used to, for example, keep a child warm. Preferably, the internal heating element 50 has multiple heat level settings similar to an electric blanket.

In yet another alternative embodiment, the cover 1 may have a plurality of securing straps 75 (FIG. 7) for securing the cover 1 to the object 200. In particular, the plurality of securing straps 75 may be located, for example, at the front 4 and/or the back 5 of the cover 1; near the internal securing bendable rods 10. Once the internal securing bendable rods 10 are bent partially around the object 200, the plurality of securing straps 75 may elective be used to further secure the cover 1 to the object 200 by, for example, tying the ends of the plurality of securing straps 75 around a portion of the object 200.

In yet another alternative embodiment, the cover 1 may utilize a magnet 80 (FIG. 1) for securing the cover 1 to the object 200. In an alternative embodiment, substantially the entire internal securing bendable rods 10 themselves may be magnetic or, alternatively, portions (as illustrated in FIG. 1) of the internal securing bendable 10 may be magnetic. As a result, the internal securing bendable rods 10 may further be secured to the object 200 (provided that the object has a metal component) by use of the magnets 80.

Figure 3:
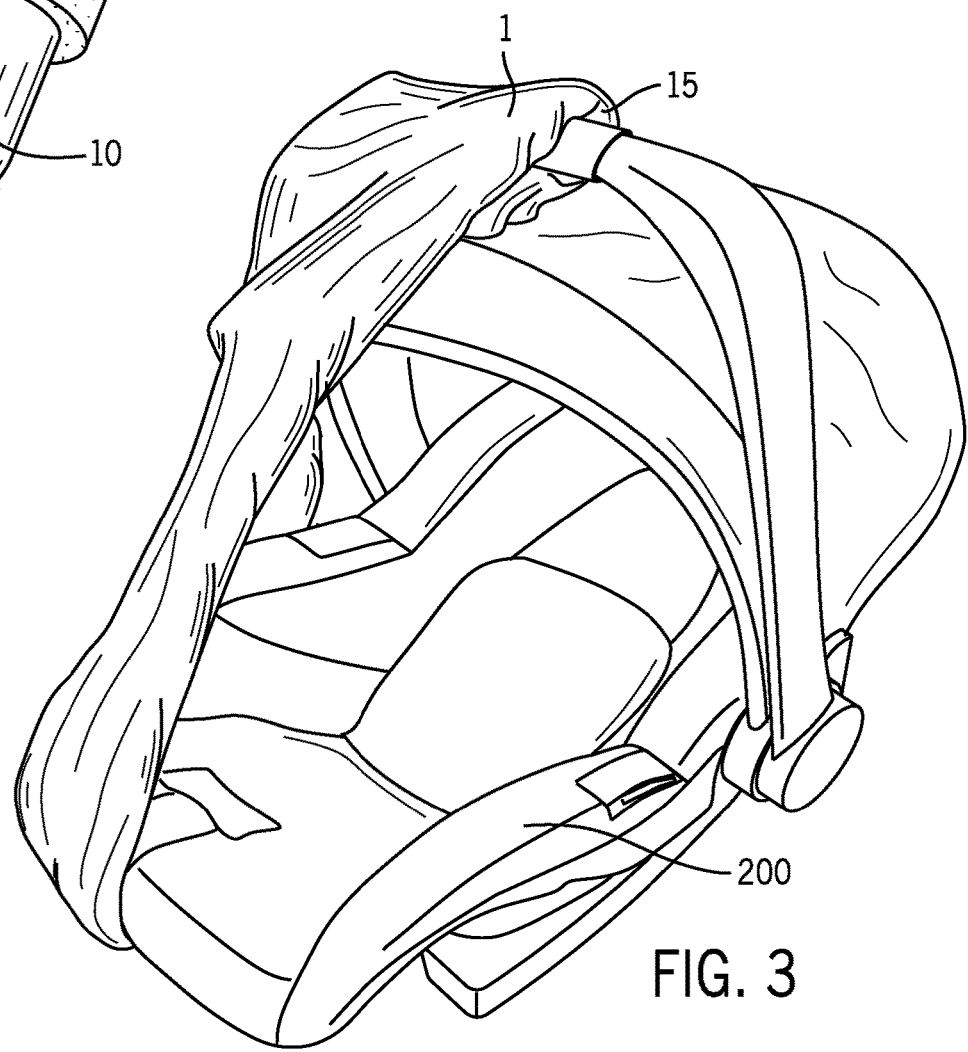
FIG. 3 illustrates a perspective view of the cover secured to a car seat.
Figure 4:
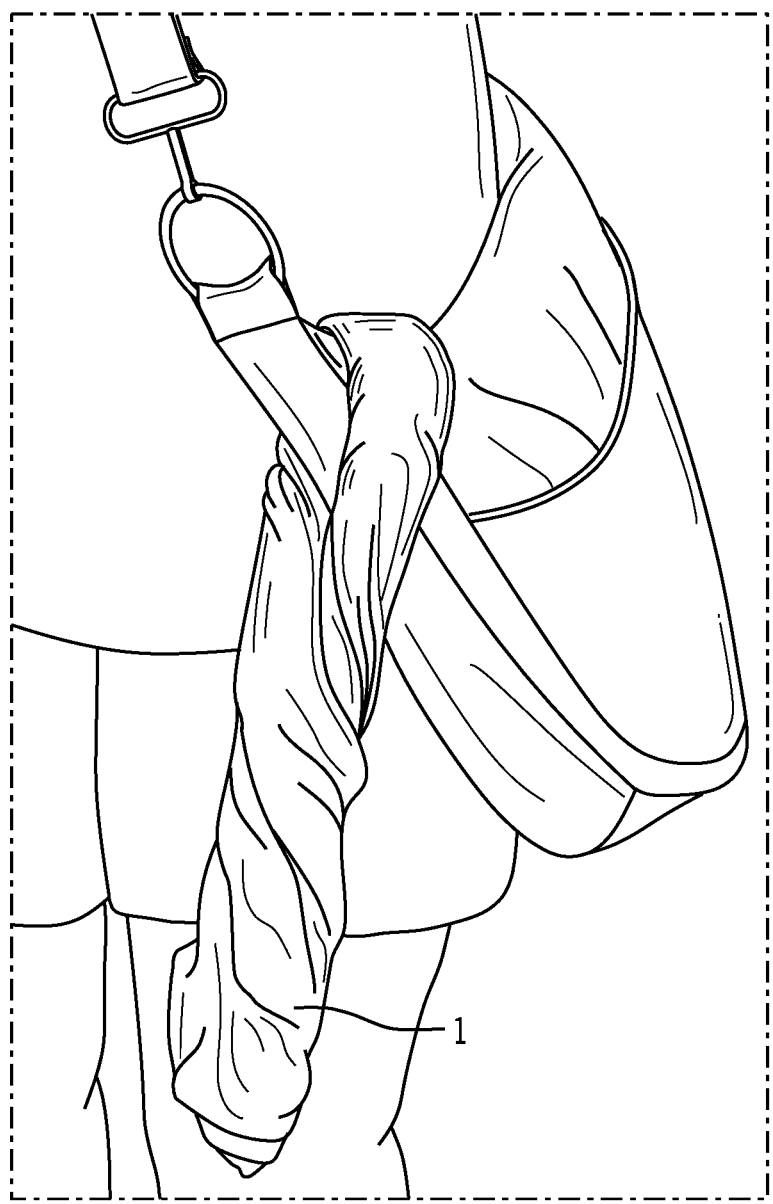
FIG. 4 illustrates a perspective view of the cover secured to an object for transportation.
Figure 5:
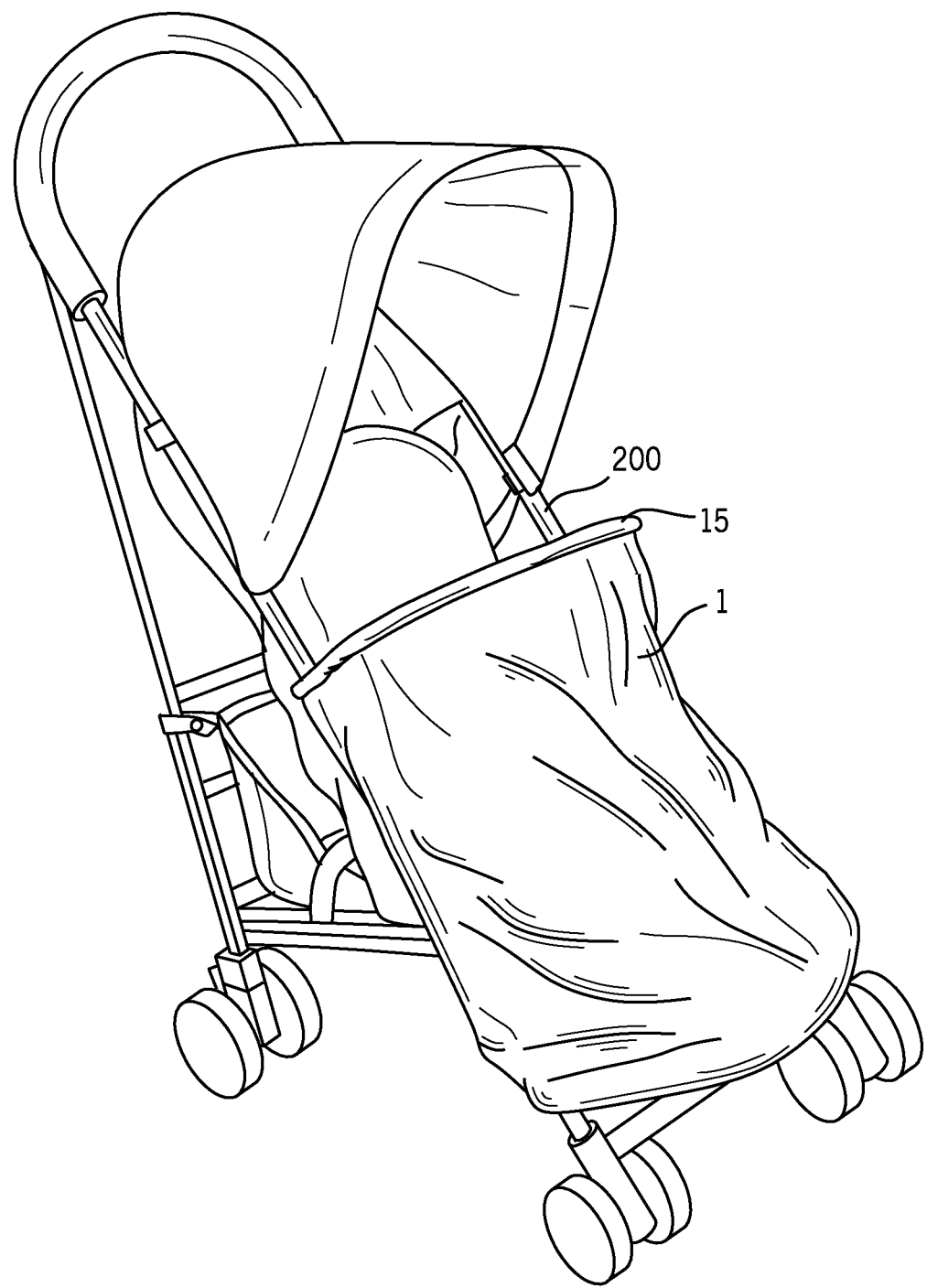
FIG. 5 illustrates a perspective view of the cover secured to a stroller.
Figure 6:
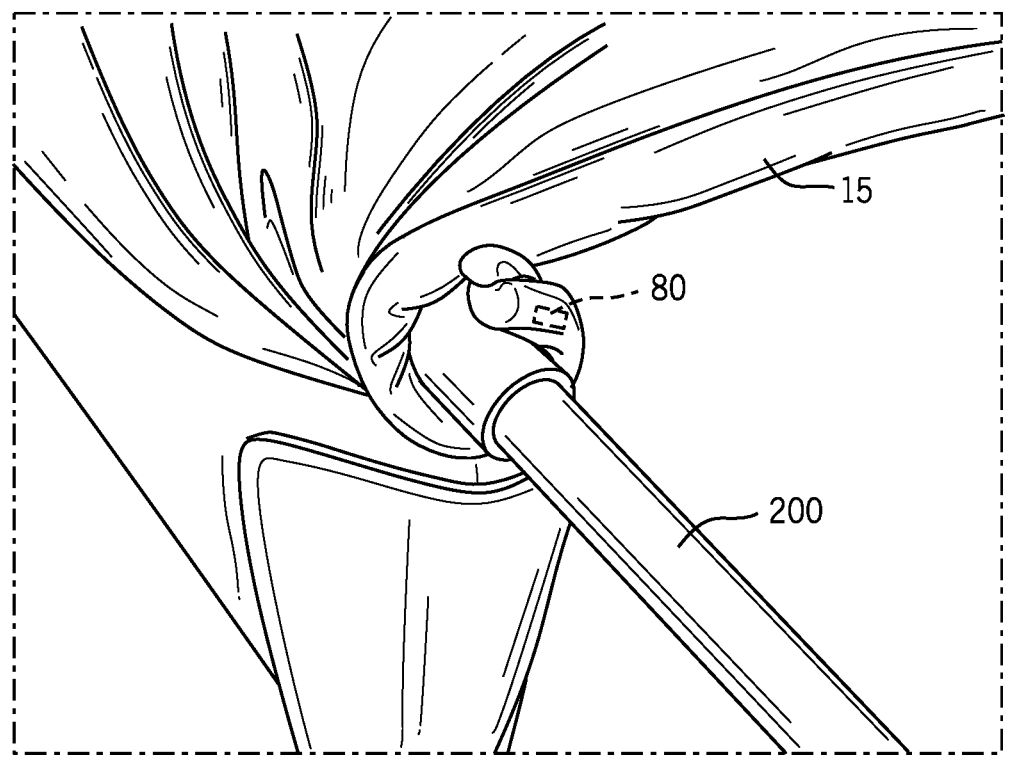
FIG. 6 illustrates a perspective view of the cover wherein an end of the internal securing bendable rod is secured around a portion of a stroller.

Referring now to FIGS. 5 and 6, in an embodiment, the ends of the internal securing bendable rods 10 may be bent (or wrapped) around a portion of the object 200 while the remainder of the internal securing bendable rods 10 remain relatively straight; therein providing warm and/or shade to a child. As a result, the cover 1 remains largely planar while the ends of the cover 1 are tightly secured to the object 200. FIG. 3 illustrates one of a limitless number of orientations in which the cover 1 may be secured to an object 200. After use, the ends of the internal securing bendable rods 10 may be removed from the object 200 (by bending the bendable rods 10 back from the object 200) and the cover 1 may then be transport in a secure and condensed manner as illustrated in FIG. 4. In particular, as illustrated in FIG. 4, in an embodiment, the two bendable rods 10 may be temporarily twisted around each other (in an embodiment, forming a loop) and may retain their twisted orientation until released. As a result, the device 1 may be temporarily secured around an object (such as a purse) for transportation.

Figure 8:
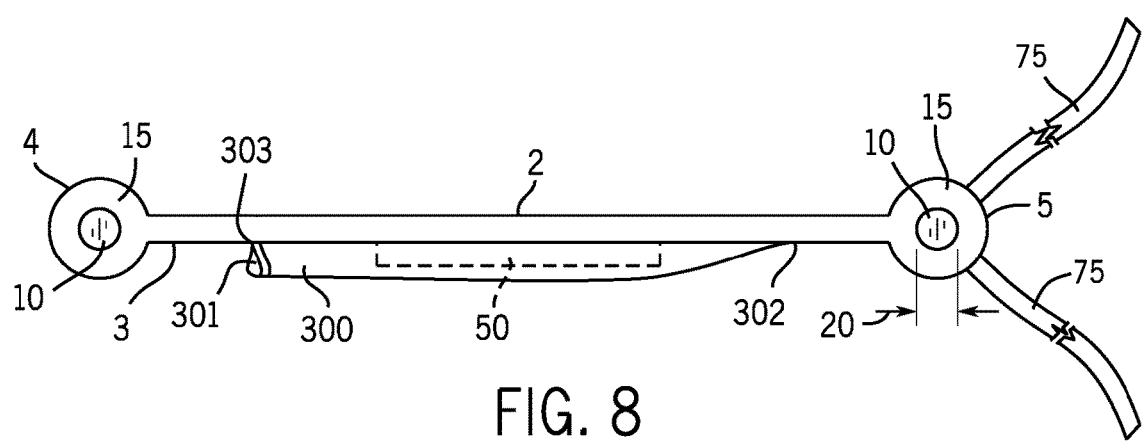
FIG. 8 illustrates a side view of an alternative embodiment wherein the cover has a second layer and wherein an opening between the first layer and second layer allow a user to insert part of his/her body into the interior of the blanket.
Figure 9:
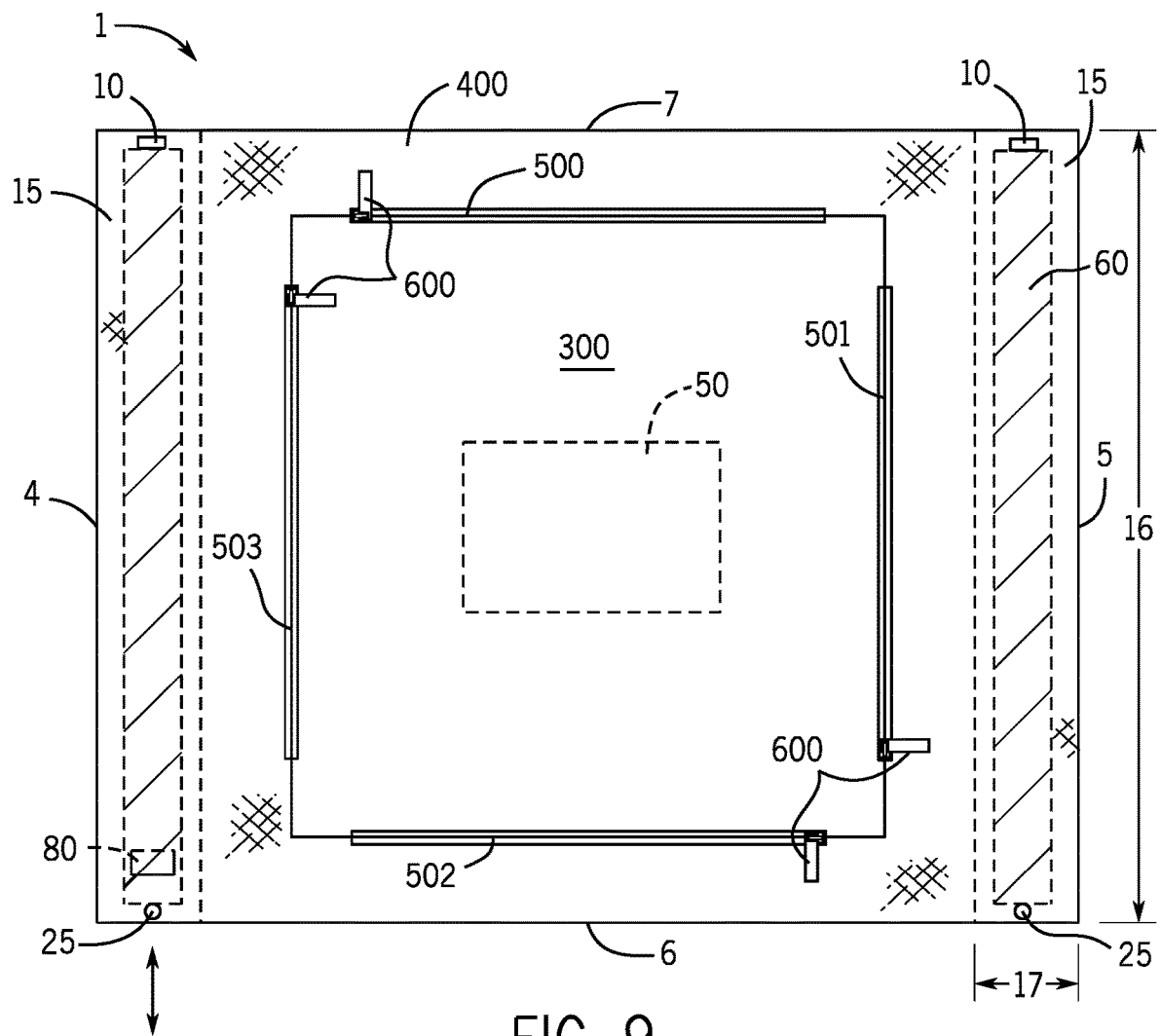
FIG. 9 illustrates a top view of the embodiment wherein the blanket has two layers.

Finally, referring now to FIGS. 8 and 9, in an alternative embodiment, the blanket may have a second layer 300. The second layer 300 may be slightly smaller than the main layer 400, as illustrated in FIG. 9. The second layer 300 may be selectively and temporarily secured to the main layer 400 along four Zippers 600 which run along four tracks 501, 502, 503 and 504 which form a general square. In use, a user may selectively unzip at least one of the four Zippers 600 to gain access to an opening 301 (FIG. 8). When at least one of the four Zippers 600 is unzipped, the opening 301 allows the user to insert a portion of his/her body, such as his/her feet, similar to a sleeping bag while the other remaining three Zippers 600 remain secured (at the sides 302, 303 and a back) to the main layer 400. Further, the user may be kept warm from the heating element 50 located within the blanket 1. Because the second layer 300 has four tracks 501, 502, 503 and 504, the user may therein utilize the internal bendable rods 10 to first secure the blanket 1 to an object and then open the most convenient Zipper 600 depending on the orientation of the blanket 1 to the object 200.

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the present application.

I claim:

1. A cover having an internal bendable rod comprising:
   a first cover having a first side, a second side, a top, a bottom, a front, a back and a sleeve portion containing a sealed hollow interior;
   at least one internal bendable rod temporarily completely secured within the sealed hollow interior of the sleeve portion wherein the internal bendable rod is capable of being bent into various orientations and may maintain the position the internal bendable rod is bent into;
   a second cover secured to the first cover wherein the second cover is smaller than the first cover and wherein the second cover is completely located within a perimeter of the first cover; and
   wherein the second cover has a first side, a second side, a third side and a fourth side and wherein a securing mechanism runs along an entire length of the first side, the second side, the third side and the fourth side of the second cover and wherein the securing mechanism is capable of independently securing or releasing the first side, the second side, the third side or the fourth side of the second cover to the first cover and therein creating an opening forming a pocket between the first cover and the second cover when three of the four sides of the second cover are secured to the first cover.

2. The cover of claim 1 wherein the sleeve portion has an opening along the front or the back of the first cover wherein the opening allows access to the sealed hollow interior of the sleeve portion.

3. The cover of claim 2 wherein the opening of the sleeve portion has a securing mechanism which is capable of temporarily securing the internal bendable rod within the sealed hollow interior of the sleeve portion or releasing the internal bendable rod from the sealed hollow interior of the sleeve portion.

4. The cover of claim 1 wherein a portion of the internal bendable rod is at least partially magnetic.

5. The cover of claim 1 wherein the sleeve portion has a length which is equal to a length of the first side or the second side of the first cover.

6. The cover of claim 1 further comprising:
   a heating element secured to the top to the bottom or within an interior of the first cover.

7. The cover of claim 1 further comprising:
   a securing strap located on the first side or the second side of the first cover wherein the securing strap is capable of securing the first cover to an object.

8. The cover of claim 1 further comprising:
   a padded portion substantially surrounding the internal bendable rod.

9. The cover of claim 8 wherein the padded portion is made of foam.

10. The cover of claim 8 wherein the padded portion is made of rubber.

11. A cover having an internal bendable rod comprising:
    a first cover having a first side, a second side, a top, a bottom, a front, a back and a sleeve portion containing a hollow interior;
    at least one internal bendable rod temporarily secured within the hollow interior of the sleeve portion wherein the internal bendable rod is capable of being bent into various orientations and may maintain the position the internal bendable rod is bent into; and wherein a portion of the internal bendable rod is at least partially magnetic;
    a second cover secured to the first cover wherein the second cover is smaller than the first cover and wherein the second cover is completely located within a perimeter of the first cover; and
    wherein the second cover has a first side, a second side, a third side and a fourth side and wherein a securing mechanism runs along an entire length of the first side, the second side, the third side and the fourth side of the second cover and wherein the securing mechanism is capable of independently securing or releasing the first side, the second side, the third side or the fourth side of the second cover to the first cover and therein creating an opening forming a pocket between the first cover and the second cover when three of the four sides of the second cover are secured to the first cover.

12. A cover having an internal bendable rod comprising:
    a first cover having a first side, a second side, a top, a bottom, a front, a back and a sleeve portion containing a hollow interior;
    at least one internal bendable rod temporarily secured within the hollow interior of the sleeve portion wherein the internal bendable rod is capable of being bent into various orientations and may maintain the position the internal bendable rod is bent into;

a heating element secured to the top to the bottom or within an interior of the first cover;

a second cover secured to the first cover wherein the second cover is smaller than the first cover and wherein the second cover is completely located within a perimeter of the first cover; and wherein the second cover has a first side, a second side, a third side and a fourth side and wherein a securing mechanism runs along an entire length of the first side, the second side, the third side and the fourth side of the second cover and wherein the securing mechanism is capable of independently securing or releasing the first side, the second side, the third side or the fourth side of the second cover to the first cover and therein creating an opening forming a pocket between the first cover and the second cover when three of the four sides of the second cover are secured to the first cover.

13. A cover having an internal bendable rod comprising:

a first cover having a first side, a second side, a top, a bottom, a front, a back and a sleeve portion containing a hollow interior;

at least one internal bendable rod temporarily secured within the hollow interior of the sleeve portion wherein the internal bendable rod is capable of being bent into various orientations and may maintain the position the internal bendable rod is bent into;

a padded portion substantially surrounding the internal bendable rod;

a second cover secured to the first cover wherein the second cover is smaller than the first cover and wherein the second cover is completely located within a perimeter of the first cover; and wherein the second cover has a first side, a second side, a third side and a fourth side and wherein a securing mechanism runs along an entire length of the first side, the second side, the third side and the fourth side of the second cover and wherein the securing mechanism is capable of independently securing or releasing the first side, the second side, the third side or the fourth side of the second cover to the first cover and therein creating an opening forming a pocket between the first cover and the second cover when three of the four sides of the second cover are secured to the first cover.

14. The cover of claim 13 wherein the padded portion is made of foam.

15. The cover of claim 13 wherein the padded portion is made of rubber.

* * * * *